June 23, 1942.                H. L. BONE ET AL                2,287,661
                        COVER SECURING MEANS FOR CASINGS
                            Original Filed Oct. 20, 1937

INVENTORS
Herbert L. Bone and
Kenneth J. J. McGowan.
BY
THEIR ATTORNEY

Patented June 23, 1942

2,287,661

UNITED STATES PATENT OFFICE 2,287,661

COVER SECURING MEANS FOR CASINGS

Herbert L. Bone, Forest Hills, and Kenneth J. J. McGowan, Pittsburgh, Pa., assignors to The Union Switch & Signal Company, Swissvale, Pa., a corporation of Pennsylvania Original application October 20, 1937, Serial No. 170,060. Divided and this application July 28, 1939, Serial No. 287,116

1 Claim. (Cl. 220—55)

Our invention relates to cover securing means for casings having removable covers to permit ready access to the interiors of the casings.

One object of our invention is to provide a cover securing means of the type described which is simple in construction and inexpensive to manufacture, and which at the same time permits a casing cover to be firmly and securely held in place.

Other objects and characteristic features of our invention will become apparent as the description proceeds.

The present application is a division of our copending application Serial No. 170,060, filed on October 20, 1937, for Railway switch operating mechanism which has ripened into Patent No. 2,184,870, dated Dec. 26, 1939.

We shall describe one form of cover securing means embodying our invention, and shall then point out the novel features thereof in the claim.

Figure 1:
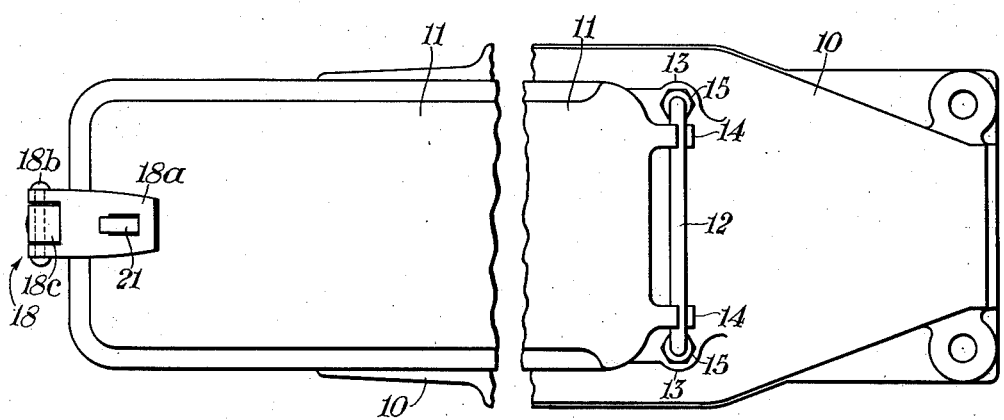
Figure 2:
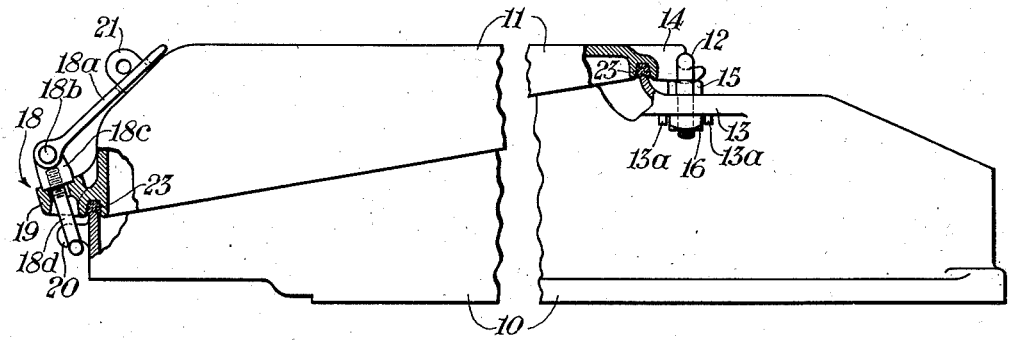

In the accompanying drawing, Fig. 1 is a top plan view showing a casing provided with a cover held in place by cover securing means embodying our invention. Fig. 2 is a side view partly in section of the casing and associated parts shown in Fig. 1.

Similar reference characters refer to similar parts in both views.

Referring to the drawing, the reference character 10 designates a casing which may be utilized to house any suitable apparatus, such for example, as that disclosed in our prior application, Serial No. 170,060 referred to hereinbefore, and the reference character 11 designates a removable cover which closes the upper end of the casing and which, when removed, permits ready access to the interior of the casing for inspection or repair of the mechanism housed therein.

In accordance with our present invention, the cover 11 is held in place at its right-hand end by means of a U-bolt 12 which overlies fingers 14 cast on the cover, and at its left-hand end by an adjustable hasp 18. The U-bolt 12 is secured to lugs 13 cast on the sides of the casing 10, by means of nuts 15 disposed above the lugs, and other nuts 16 disposed below the lugs, the lower nuts being made square, and being seated in a recess formed by depending projections 13a provided on the lugs, whereby it is impossible to remove the nuts 16 without first removing the cover, and then backing off the upper nuts 15 a sufficient amount.

The adjustable hasp 18 comprises a strap 18a pivotally attached by means of a pin 18b to a nut 18c screwed onto the upper end of a T-headed bolt 18d. The bolt 18d extends downwardly through a hole in a lug 19 provided on the cover, and cooperates at its head with a pair of fingers 20 formed on the left-hand end wall of the casing 10. The strap 18a slips over a hasp eye 21 secured to the cover 11, thereby permitting the parts to be locked in place by a padlock or the like. To fasten the cover in place the fingers 14 are first inserted under the U-bolt 12, and the head of the bolt 18d is then placed under the fingers 20. The nut 18c is next tightened by using the strap 18a as a means for turning the nut, after which the strap is dropped over the eye 21 and a padlock is inserted through the eye. To remove the cover, the opposite procedure is followed. It will be obvious, of course, that when the cover is unfastened, it can be readily lifted clear of the casing, thus permitting ready access to the operating parts of the mechanism. To insure a good seal between the cover and the casing, the cover is formed with a peripheral groove containing packing 23 which seals against the casing.

Although we have herein shown and described only one form of cover securing means embodying our invention, it is understood that various changes and modifications may be made therein within the scope of the appended claim without departing from the spirit and scope of our invention.

Having thus described our invention, what we claim is:

Means for securing one end of a removable cover to a casing comprising lugs provided on the sides of the casing and a U-bolt overlying fingers provided on the cover and secured at its ends to said lugs by means of nuts screwed onto the bolt above the lugs and other nuts screwed onto the bolt below the lugs, the lower nuts being disposed in recesses formed on the undersides of the lugs, whereby said U-bolt is adjustable but cannot be adjusted or removed without first removing said cover and then backing off the upper nuts a sufficient amount to permit the lower nuts to clear said recesses.

HERBERT L. BONE.
KENNETH J. J. McGOWAN.